(12) United States Patent
Bhayani et al.

(10) Patent No.: US 12,111,955 B2
(45) Date of Patent: Oct. 8, 2024

(54) AUTOMATIC OBSCURATION OF A PORTION OF A SCREEN-SHARE VIEW

(71) Applicant: Avaya Management L.P., Durham, NC (US)

(72) Inventors: Vijaykumar Bhayani, Surat (IN); Divyarajsinh Jadeja, Pune (IN); Prateek Singh, Noida (IN)

(73) Assignee: Avaya Management L.P., Morristown, NJ (US)

( * ) Notice: Subject to any disclaimer, the term of this patent is extended or adjusted under 35 U.S.C. 154(b) by 0 days.

(21) Appl. No.: 17/501,234

(22) Filed: Oct. 14, 2021

(65) Prior Publication Data

US 2023/0117924 A1    Apr. 20, 2023

(51) Int. Cl.
| | | |
|---|---|---|
| *G06F 3/048* | (2013.01) | |
| *G06F 21/54* | (2013.01) | |
| *G06F 21/62* | (2013.01) | |
| *G06N 20/00* | (2019.01) | |

(52) U.S. Cl.
CPC ............ *G06F 21/629* (2013.01); *G06F 3/048* (2013.01); *G06F 21/54* (2013.01); *G06N 20/00* (2019.01); *G06F 2221/032* (2013.01); *G06F 2221/2125* (2013.01)

(58) Field of Classification Search
None
See application file for complete search history.

(56) References Cited

U.S. PATENT DOCUMENTS

| | | | |
|---|---|---|---|
| 7,774,851 B2 | 8/2010 | Singh et al. | |
| 7,930,762 B1 | 4/2011 | Blair et al. | |
| 8,050,698 B2 | 11/2011 | Seligmann et al. | |
| 10,831,908 B1 * | 11/2020 | Austin | G06F 3/04883 |
| 11,245,735 B1 * | 2/2022 | Kwatra | H04L 65/1089 |
| 2015/0061970 A1 * | 3/2015 | Kim | G06F 3/1423 345/2.3 |
| 2015/0278534 A1 * | 10/2015 | Thiyagarajan | G06F 21/84 726/28 |
| 2017/0200021 A1 * | 7/2017 | Patel | H04L 65/70 |
| 2018/0336373 A1 * | 11/2018 | Deenadayal | G06T 5/70 |
| 2019/0075218 A1 * | 3/2019 | Ribani | H04N 1/00411 |
| 2020/0366959 A1 | 11/2020 | Pau et al. | |
| 2022/0277435 A1 * | 9/2022 | Muthusamy | G06T 5/60 |
| 2023/0042015 A1 * | 2/2023 | Rey | G06F 3/0484 |

FOREIGN PATENT DOCUMENTS

| | | | | |
|---|---|---|---|---|
| GB | 2590967 A * | 7/2021 | ......... | G06F 21/6245 |
| KR | 101770937 B1 | 8/2017 | | |

* cited by examiner

*Primary Examiner* — Xuyang Xia

(57) ABSTRACT

The technology disclosed herein enables automatic obscuration of a portion of a view shared during a screen sharing session. In a particular embodiment, a method includes receiving a view displayed by a first user system to a first user. The method further includes identifying a portion of the view not to be shared and obscuring the portion of the view to generate a shared view. Also, the method includes transmitting the shared view to a second user system over a real-time screen sharing session, wherein the second user system displays the shared view to a second user.

14 Claims, 8 Drawing Sheets

AUTOMATIC OBSCURATION OF A PORTION OF A SCREEN-SHARE VIEW

TECHNICAL BACKGROUND

A screen sharing client executing on a user system captures visuals displayed by the user system (e.g., entire desktops, particular application windows, etc.) and sends the visuals to one or more other systems for display thereat in real time. Users at the other systems are then able see what the user system is displaying without having to be located at the user system. Many screen sharing clients are incorporated into telecommunication clients (e.g., a videoconferencing client), which provides screen sharing features to participants on telecommunication sessions. For example, a user may want to show a document to other users on a telecommunication session and initiates a screen sharing session to share their desktop view, which includes a window showing the document, accordingly. During the screen sharing session, there may be content, other than the document, that is captured for sharing that the user does not want to be shared with others.

SUMMARY

The technology disclosed herein enables automatic obscuration of a portion of a view shared during a screen sharing session. In a particular embodiment, a method includes receiving a view displayed by a first user system to a first user. The method further includes identifying a portion of the view not to be shared and obscuring the portion of the view to generate a shared view. Also, the method includes transmitting the shared view to a second user system over a real-time screen sharing session, wherein the second user system displays the shared view to a second user.

In some embodiments, the method includes displaying an indication of the portion of the view to the first user. The indication may include a border around the portion of the view.

In some embodiments, the method includes receiving user input from the first user, wherein the user input modifies the portion of the view.

In some embodiments, identifying the portion of the view includes providing the view to a machine learning algorithm trained to identify display elements that are not to be viewed by a second user. The machine learning algorithm may output parameters defining locations of the view that are included in the portion of the view. In these examples, the method may include providing, to the machine learning algorithm, training views and indications of a portion in the training views that are not to be shared to train the machine learning algorithm. In some cases, the method also includes receiving user input from the first user, wherein the user input modifies the portion of the view and providing, to the machine learning algorithm, the view and an indication of the portion of the view, as modified by the user input, to train the machine learning algorithm. In those cases, the method may include receiving second user input that requests for the view and the indication be used to train the machine learning algorithm.

In some embodiments, the method includes receiving user input enabling a view-obscuring feature, wherein obscuring the portion of the view to generate the shared view occurs when the view-obscuring feature is enabled.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to receive a view displayed by a first user system to a first user. The program instructions further direct the processing system to identify a portion of the view that not to be shared obscure the portion of the view to generate a shared view. The program instructions also direct the processing system to transmit the shared view to a second user system over a real-time screen sharing session, wherein the second user system displays the shared view to a second user.

DETAILED DESCRIPTION

The screen sharing system described herein automatically identifies and obscures a portion of a user's view being shared on a screen sharing session. The portion is, therefore, unable to be viewed by other users on the screen sharing session. The portion may include any type of content that a user may not want to be shared (e.g., the content may be private or embarrassing for the user) including content within a window having content that the user wants to be shared. For example, a web browser window may be included in the user's shared view to show a webpage to other users on a screen sharing session. There may be display elements in the web browser window that include content that the user would not want shared (nor has any reason to be shared). For instance, the window may show other open browser tabs that are not currently in the foreground, which the user may not want others to see. Similarly, the webpage shown in the browser window may include a targeted advertisement that the user may not want other users to see along with the rest of the webpage. The screen sharing system identifies the above display elements (i.e., the browser tabs and targeted advertisement) and obscures (e.g., blurs, blacks out, etc.) a portion of the view that includes the display elements before transmitting the view to others on the screen sharing session.

Figure 1:
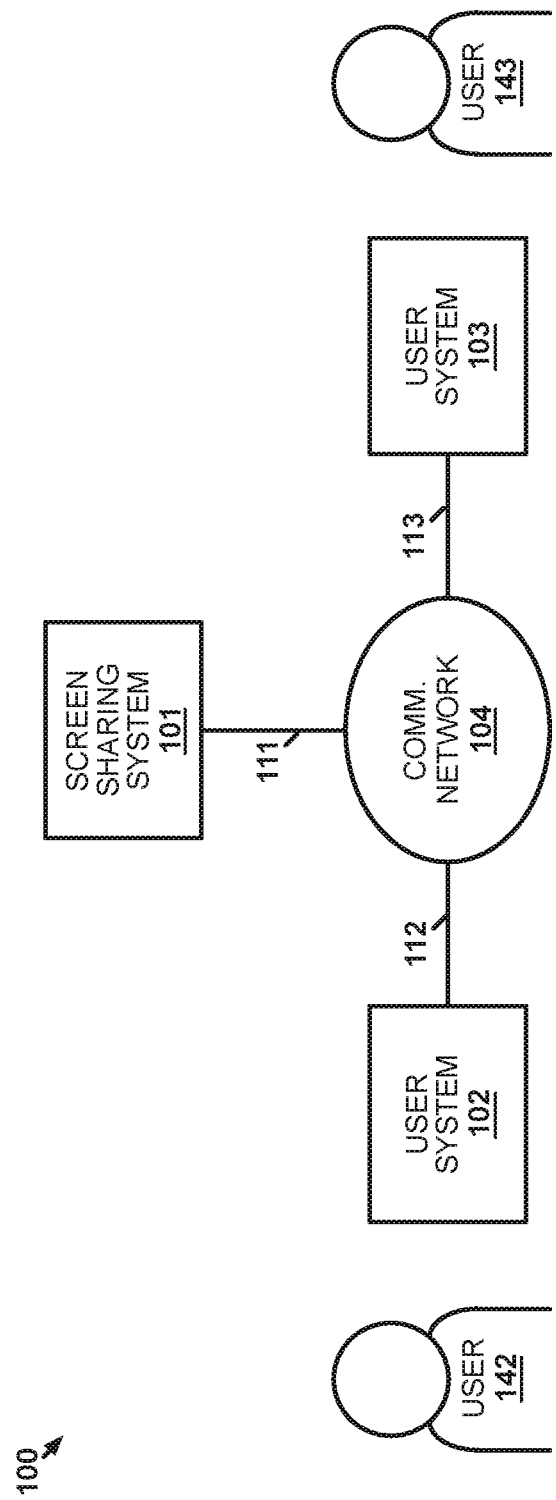
FIG. 1 illustrates an implementation for automatically obscuring a portion of a view shared during a screen sharing session.

FIG. 1 illustrates implementation 100 for automatically obscuring a portion of a view shared during a screen sharing session. Implementation 100 includes screen sharing system 101, user system 102, user system 103, and communication network 104. Screen sharing system 101 and communication network 104 communication over communication link 111. User system 102 and communication network 104 communication over communication link 112. User system 103 and communication network 104 communicate over communication link 113. Communication links 111-113 may be wired and/or wireless. Communication links 111-113 are shown as direct links but may include intervening systems, networks, and/or devices. User 142 operates user system 102 and user 143 operates user system 103. User systems 102-103 may each be a telephone, laptop, personal computer, tablet computer, or some other type of user operable computing system. Communication network 104 includes one or more networks, such as a circuit switched telephone network, local area packet network, wide area network (e.g., the Internet), or some other type of network over which telecommunications may be carried including combinations thereof.

In operation, screen sharing system 101 facilitates real-time screen sharing sessions between two or more user system endpoints (user system 102 and user system 103 in this example). In some examples, user system 102 and/or user system 103 may execute a client application to connect to screen sharing system 101 to connect to a view-sharing session. A view-sharing session may be a component of, or otherwise associated with, a real-time user communication (e.g., voice/video call, text chat, etc.) between user system 102 and user system 103. For example, user 142 may be speaking with user 143 over a video call session and may choose to share the screen of user system 102 over that session to show something displayed thereon to user 143 in real-time. During a screen sharing session, any changes to the view displayed by user system 102 to user 142 are propagated to a display of the view in real-time at user system 103 for user 143 to see. While only two user systems are described in this example, any number of user systems may join a screen sharing session. The view at user system 102 would then be propagated to all the systems on the session.

Figure 2:
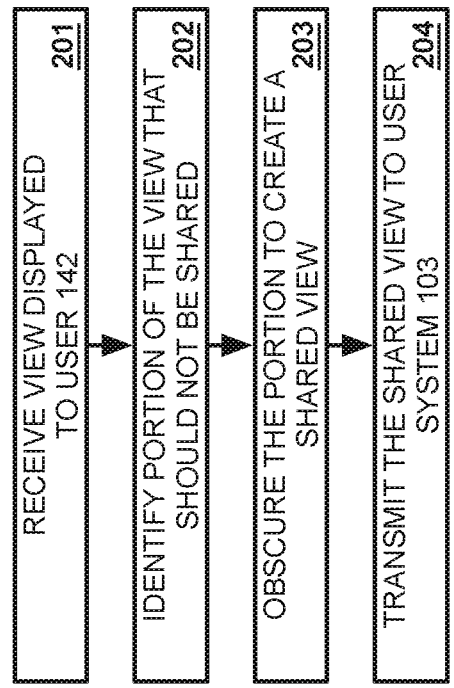
FIG. 2 illustrates an operational scenario to automatically obscure a portion of a view shared during a screen sharing session.

FIG. 2 illustrates operational scenario 200 to automatically obscure a portion of a view shared during a screen sharing session. In operational scenario 200, screen sharing system 101 receives a view displayed by user system 102 to user 142 (201). The view may include the entirety of what is being displayed by user system 102 or may be a subset of what is being displayed (e.g., only a particular window or windows, a particular application or applications, etc.). The view is received by screen sharing system 101 over a screen sharing session facilitated by screen sharing system 101 between user system 102 and user system 103. The view may be captured at user system 102 by a screen sharing client application executing thereon. To facilitate the real-time aspect of the screen sharing session, the view may continually captured and encoded into a video stream transmitted to screen sharing system 101 from user system 102. Alternative mechanisms for transmitting the view may also be used.

Screen sharing system 101 identifies a portion of the view not to be shared (202). Screen sharing system 101 may use an image recognition algorithm(s) to process the view and identify display elements therein (e.g., windows, portions of windows, images, text blocks, icons, etc.). Predefined rules may be used to determine which of the display elements should be included in the portion. For instance, the rules may indicate to include in the portion all advertisements, all windows of a particular application(s), only certain windows of particular application(s), certain display elements within application interfaces, and/or some other definition of a display element. The identified portion does not have to be contiguous within the view. Rather, the portion may include display elements scattered throughout the view and not touching one another.

In some examples, the Artificial Intelligence (AI) of a machine learning model may be employed to identify the portion of the view. The machine learning model may be trained using a training set of views that indicates in each view a portion that should not be shared. The machine learning model automatically learns characteristics of the display elements in the portions that should not be shared and characteristics of display elements that should be shared. As such, when the view from user system 102 is provided to the machine learning model in this example, the model outputs the portion that the model has determined to include display elements not to be shared based on the learned characteristics. The model may be trained in general for use across all user systems or may be tailored to user 142's preferences specifically. Also, during the screen sharing session, user system 102 may present an interface to user 142 that enables user 142 to modify the portion not to be shared. For instance, user 142 may be able to indicate display elements that should be obscured but currently are not, may be able to change the size/shape of an area being obscured, may be able to indicate a display element currently being obscured that should not be obscured, or may modify the portion in some other manner. In addition to changing the portion of the current view, the modifications by user 142 may also be used to further train the machine learning algorithm. User 142 may be given the option regarding whether the modifications should be used to train the machine learning algorithm.

Screen sharing system 101 obscures the portion of the view identified above to generate a shared view (203). Screen sharing system 101 may blur the portion, may insert a opaque color or pattern over the portion (e.g., may blackout the portion or use a color that is similar to colors surround the pattern), or may prevent the portion from being viewed when displayed at the receiving end of the screen sharing session in some other manner—including combinations thereof. The generated shared view is, therefore, a version of the view that has the portioned obscured but is otherwise unmodified from the condition in which it was received from user system 102. In some examples, the shared view may indicate that the portion is intentionally obscured so that user 143 does not think there is an issue with user system 103 that is causing the portion to be obscured.

Screen sharing system 101 transmits the shared view to user system 103 over the real-time screen sharing session (204). User system 103 displays the shared view to user 143. Since the original view received from user system 102 is not transmitted to user system 103, user system 103 is not able to display the obscured portion of the shard view. As the view is continually updated from user system 102 to screen sharing system 101 (e.g., based on user 142 interacting with user system 102), screen sharing system 101 continues in real-time to identify a portion of the view not to be shared, obscure the portion to generate the shared view, and transmit the shared view to user system 103 for display. For instance, user 142 may open a new application that changes the view (e.g., a window for the new application will be displayed by user system 102 to user 142) and screen sharing system 101 will receive the view including that change. Screen sharing system 101 will then determine whether anything in the change should be included in the portion and generate the shared view accordingly.

Advantageously, with screen sharing system 101 automatically obscuring a portion of the view from user system 102, user 142 should not have to worry about unwanted content being shared with user 143 or any other user on the session. Screen sharing system 101 may implement the above-described view-obscuring feature with all screen sharing sessions or user 142 may provide input to enable the feature. For example, a screen sharing interface at user system 102 may provide a toggle for user 142 to enable/disable the view-obscuring feature.

While the example above describes the view-obscuring feature being implemented in screen sharing system 101, other examples may implement the view-obscuring feature in a system other than that which facilitates the screen sharing session, such as user system 102. In some cases, screen sharing system 101 may not be necessary to facilitate a screen sharing session. Rather, user system 102 and user system 103 may establish a screen sharing session on a peer-to-peer basis.

Figure 3:
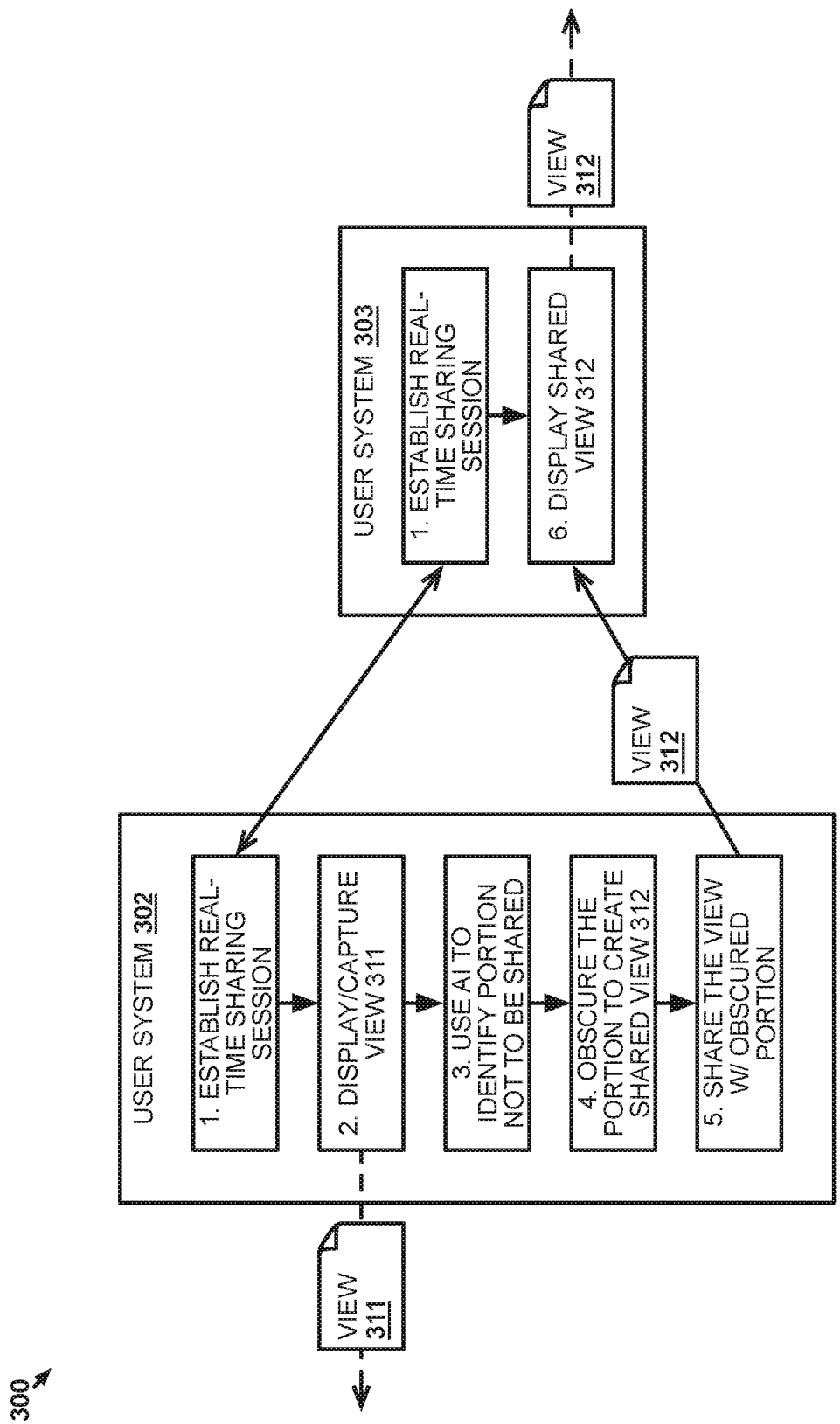
FIG. 3 illustrates an operational scenario to automatically obscure a portion of a view shared during a screen sharing session.

FIG. 3 illustrates operational scenario 300 to automatically obscure a portion of a view shared during a screen sharing session. Operational scenario 300 describes operations of user system 302 and user system 303. User system 302 and user system 303 are examples of user system 102 and user system 103, respectively, in an example where screen sharing system 101 does not provide the view-obscuring feature. Rather, user system 302 performs the steps of the view-obscuring feature itself. It should, therefore, be understood that similar steps may be performed by screen sharing system 101 in examples where screen sharing system 101 performed the view-obscuring feature.

In operational scenario 300, user system 302 and user system 303 establish a real-time screen sharing session between themselves at step 1. User system 302 captures view 311, which is currently being displayed, to receive view 311 for processing at step 2. Rather than sharing view 311 as captured, user system 302 provides view 311 at step 3 to a machine learning algorithm AI that identifies a portion not to be shared over the real-time screen sharing session. The AI identifies the portion by providing output that specifies a location(s) in view 311 that should be obscured. Each location output by the AI identifies an area of view 311. The area may be defined based on distances (e.g., measured in pixels of the view) from an origin point (e.g., a corner of the view, the center of the view, etc.) and may define a shape and size of an area. Based on the location(s) output by the AI, screen sharing system 101 obscures the portion of view 311 defined by the location(s) to create shared view 312 at step 4. As noted before, the portion may be obscured by blurring the location, by replacing the portion with other visual information (e.g., blacking out the portion), or otherwise preventing the content displayed in the portion from being included in shared view 312. In some examples, rather than the machine learning algorithm simply outputting location(s) of the portion, the machine learning algorithm may be trained to obscure the portion. Shared view 312 would be the output of the algorithm when view 311 is input in those examples.

User system 302 shares shared view 312 with user system 303 at step 5 by transmitting shared view 312 to user system 303 over the screen sharing session. Upon receiving shared view 312, user system 303 displays shared view 312 at step 6. During the screen sharing session steps 106 continue to be performed to provide updates to view 311 and shared view 312 in real-time. Shared view 312 is, therefore, always up to date with what is being displayed by user system 302 in view 311, although, with an AI identified portion of view 311 being obscured. In some examples, it is possible that the AI does not identify any portion of view 311 that should be obscured. In those cases, shared view 312 may be identical to view 311 until the AI finds something in view 311 that should be obscured (e.g., a new window may be opened into view 311 that AI determines should be obscured).

Figure 4:
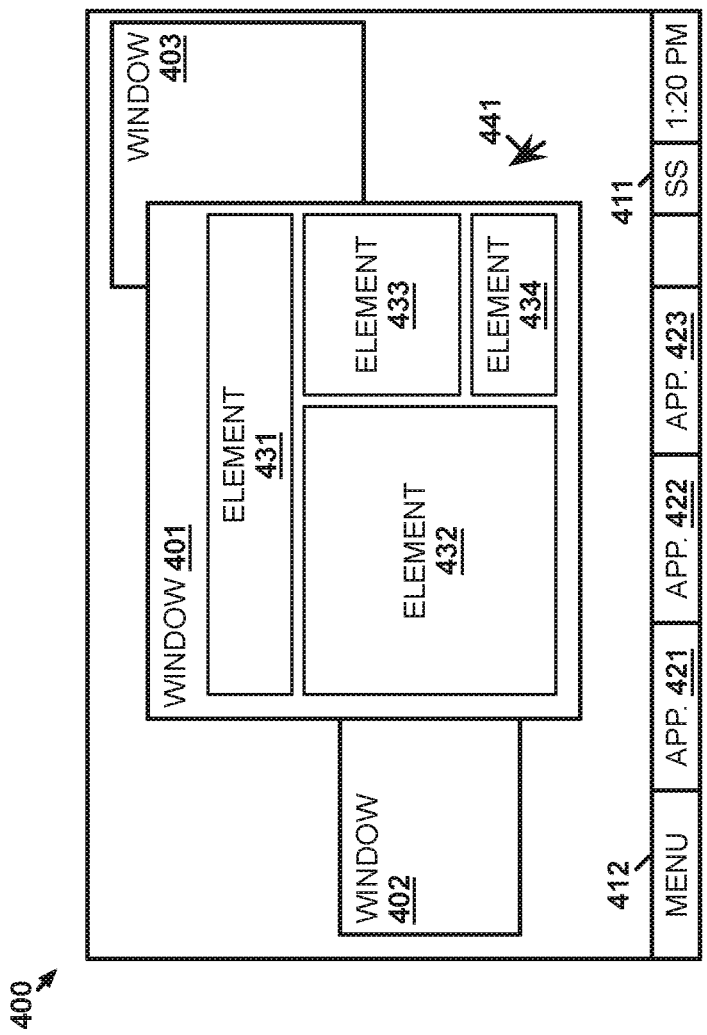
FIG. 4 illustrates a display view for automatically obscuring a portion of a view shared during a screen sharing session.

FIG. 4 illustrates display view 400 for automatically obscuring a portion of a view shared during a screen sharing session. Display view 400 includes an example Graphical User Interface (GUI) of an operating system executing on user system 102 and is displayed by a display of user system 102. Display view 400 is sometimes referred to as a desktop of the operating system. In this example, user system 102 is executing application 421, application 422, and application 423. Display view 400 includes application window 401 of application 421, application window 402 of application 422, and application window 403 of application 423. Window 401 is currently the focus window (e.g., the window that is at the forefront on display view 400) while windows 402 and 403 are not the focus and can, therefore, be behind window 401, as shown. Display view 400 includes menu bar 412 at the bottom of the GUI, although, an OS in another example may position menu bar 412 elsewhere or not include menu bar 412 at all in favor of a different type of GUI. Menu bar 412 shows that application 421, application 422, and application 423 are currently open on user system 102. The right side of menu bar 412 includes tray 411, which shows that a screen sharing client (i.e., "SS") is executing. In other examples, the screen sharing client may by included with applications 421-423 on menu bar 412 outside of the tray 411. In some examples (e.g., those where the screen sharing client is also a real-time voice/video communication client), the screen sharing client may display a window in display view 400. Cursor 441 is controlled by user 142 using a mouse or trackpad of user system 102 to interact with elements displayed in display view 400 (e.g., select icons, select windows, move windows, interact with windows, etc.). Other examples may use different user input devices to enable user 141 to move cursor 441 or may eschew cursor 441 altogether for interacting with display view 400 (e.g., a touchscreen without a displayed cursor).

In this example, application window 401 includes display elements 431-434. Display elements 431-434 may include any type of content that can be displayed by a user system. The content may be an icon, text, graphic, photo, video, menu item, interface button, or some other distinct item of visual content—including combinations thereof. Although not shown for clarity, application window 402 and application window 403, or the background on which they are displayed, may similarly include display elements. In some examples, the background itself may be a display element. While display elements 431-434 are shown with borders to differentiate from one another, it should be understood that no such border is necessary for differentiation between display elements (e.g., an advertisement may be displayed next to a text block with no dividing element, such as a line or border, in between).

For the purposes of this example, the entirety of display view 400 is captured by the screen sharing client and shared with user system 103. In other examples, the screen sharing client may capture less than all of what is shown in display view 400 for sharing. For instance, the screen sharing client may only capture and share window 401.

Figure 5:
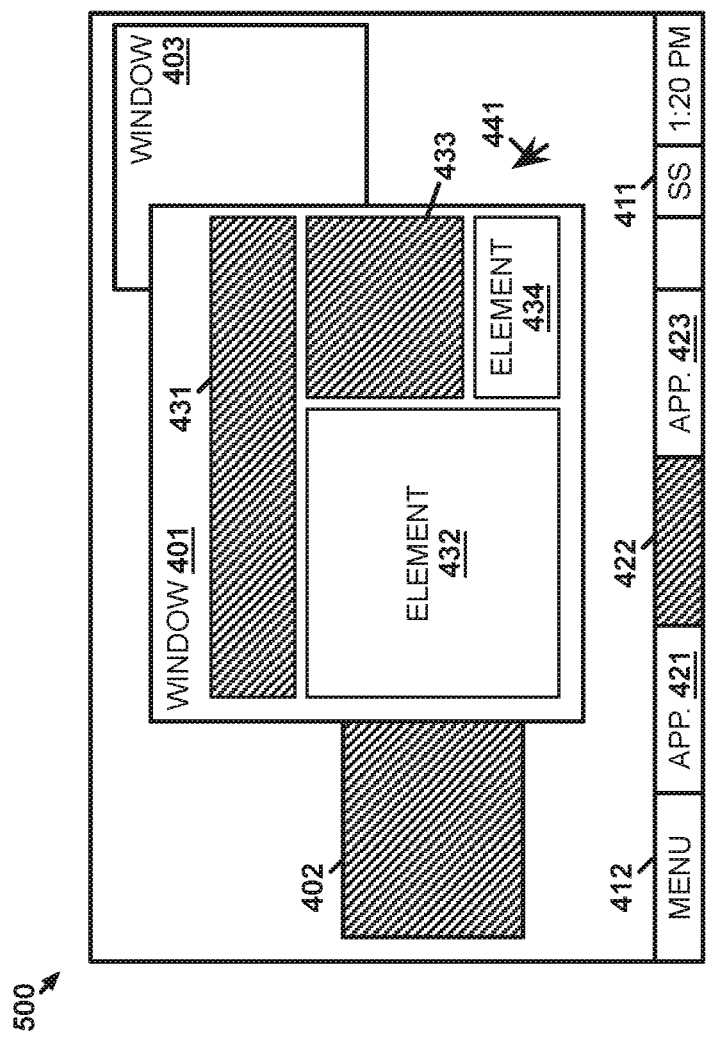
FIG. 5 illustrates a display view for automatically obscuring a portion of a view shared during a screen sharing session.

FIG. 5 illustrates display view 500 for automatically obscuring a portion of a view shared during a screen sharing session. Display view 500 is an example of a shared view generated from display view 400 by screen sharing system 101 (or user system 102 itself in examples where user system 102 provides the view-obscuring feature). Display view 500 is, therefore, an example of how display view 400 is displayed at user system 103 after a portion of display view 400 has been obscured from view by screen sharing system 101, as described above. As can be seen in display view 500, the portion of display view 400 that has been obscured includes application window 402, the place holder for application 422 in menu bar 412, display element 431, and display element 433.

In an example, application 421 may be a web browser application with application window 402 being a browser window of application 421. Display element 431 may be a browser tab bar that is common in modern web browsing windows and display element 433 may be an advertisement on a webpage being displayed in application window 401. The tab bar may be included in the obscured portion so that other webpages in other tabs of application window 401 remain private to user 142. The advertisement may be included so that the types of products/services being targeted to user 142 remains private. Also, in this example, application 422 may be an instant messaging application that includes messaging conversations that should remain private. In addition to obscuring application window 402 in the portion, screen sharing system 101 includes the indicator for application 422 in the obscured portion. By obscuring the indicator for application 422, user 143 is unaware of the particular application and application window that is being obscured, which further enhances user 142's privacy.

While the discussion in the above example provides reasons for why display element 431, display element 433, application window 402, and the indicator of application 422 are included in the portion, it should be understood that those reasons may be irrelevant to screen sharing system 101's determination to included them in the obscured portion. Rather, screen sharing system 101 may instead rely solely on characteristics of the display elements themselves. For instance, a machine learning algorithm AI may identify the portion based on the characteristics of the elements being displayed in display view 400.

Figure 6:
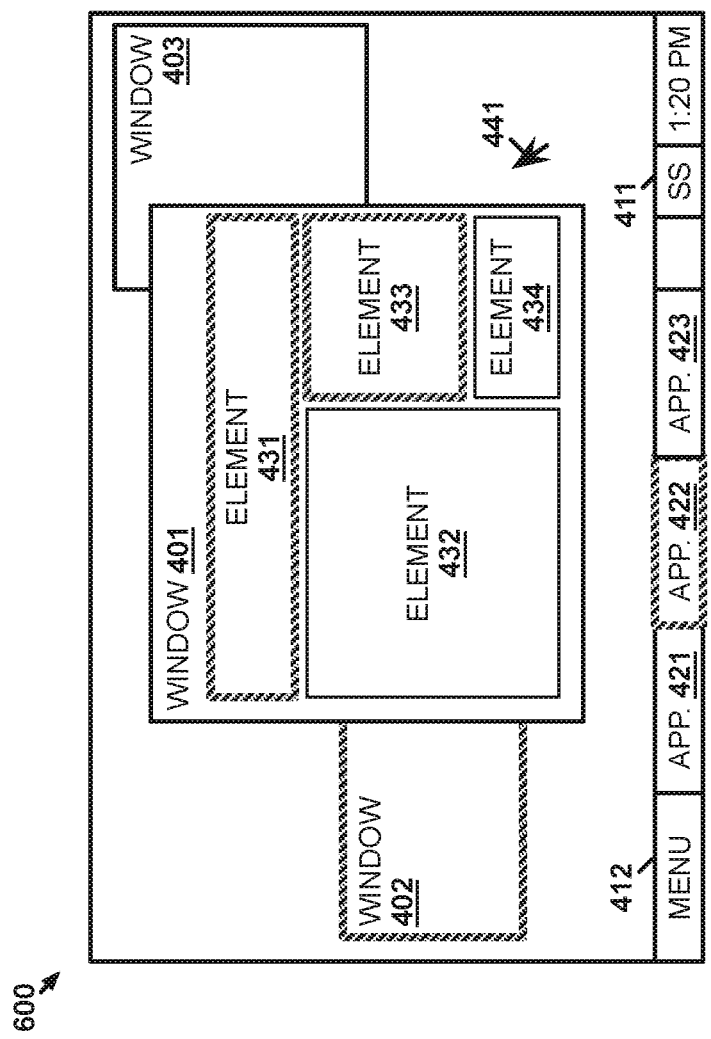
FIG. 6 illustrates a display view for automatically obscuring a portion of a view shared during a screen sharing session.

FIG. 6 illustrates display view 600 for automatically obscuring a portion of a view shared during a screen sharing session. Display view 600 is an example of how display view 400 may be displayed by user system 102 to user 142 when display view 400 is being shared to user system 103 as display view 500. In particular, the display elements being obscured by screen sharing system 101 to generate display view 500 are indicated in display view 600. A unique border surrounds display element 431, display element 433, application window 402, and the indicator of application 422 to signify that those elements are included in the obscured portion of display view 500. Other examples may use alternative mechanisms for indicating the obscured portion (e.g., may shade/dim the obscured portion) while still allowing user 142 to view the content.

Figure 7:
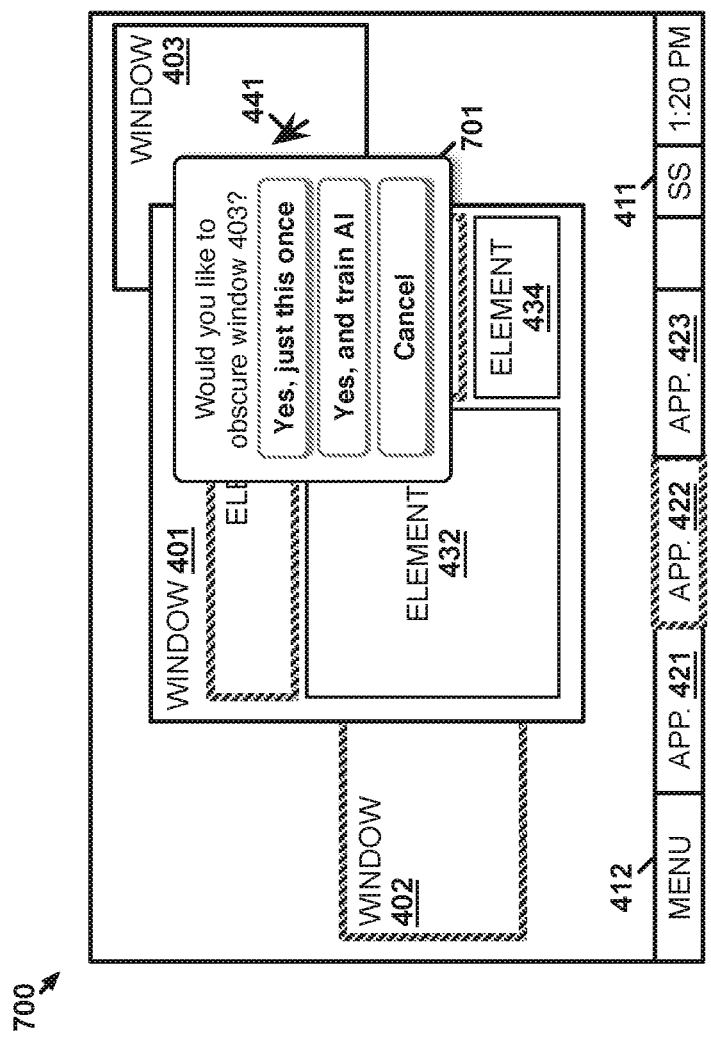
FIG. 7 illustrates a display view for automatically obscuring a portion of a view shared during a screen sharing session.

FIG. 7 illustrates display view 700 for automatically obscuring a portion of a view shared during a screen sharing session. Display view 700 is displayed by user system 102 to user 142 and is an example of display view 600 after user 142 triggers the display of query window 701. Query window 701 is displayed as part of a mechanism for user 142 to provide input to screen sharing system 101, via user system 102, modifying the portion that is obscured to generate display view 500. In this example, user 142 provides input that triggers the display of query window 701. The input indicates that user 142 wants application window 403 to also be included in the portion that is obscured in display view 500. In one example, user 142 may position cursor 441 over application window 403 and right click for user system 102 to display a menu of options. One of those options may be from the screen sharing client and, when selected, opens query window 701. In another example, user 142 may select the indicator for the screen sharing client in tray 411 (or may use a keyboard hot key command, voice command, etc.), which may enable user 142 to select a display element that should be included in the portion that is obscured by screen sharing system 101. For instance, cursor 441 may be use to trace or otherwise indicate a display element (i.e., application window 403 in this case) that should be included in the obscured portion.

In some examples, upon user 142 indicating application window 403 for inclusion in the obscured portion, screen sharing system 101 may simply begin obscuring application window 403. In this example, query window 701 is displayed to at least receive confirmation the user 142 intends for application window 403 to be included in the obscured portion. Query window 701 provides user 142 with three different options. User 142 may select that, yes, they want application window 403 to be obscured but just this once or that, yes, they want application window 403 obscured but they also want to train the machine learning algorithm to include windows like application window 403 in the obscured portion automatically in the future. Should user 142 select the latter "yes" option, screen sharing system 101 feeds application window 403 into the machine learning algorithm with an indication that application window 403 should be included in the obscured portion. The machine learning algorithm automatically trains itself based on the characteristics of application window 403 (e.g., the application associated therewith, the content displayed in the window, interface elements in the window, etc.) to recognize similar windows in the future. Query window 701 also provides user 142 with the option to cancel, as may be the case if they inadvertently selected application window 403 or have since changed their mind.

In the above example, user 142 is able to indicate a display element that was not included in the obscured portion, as shown in display view 500. In other examples, user 142 may be able to modify the obscured portion in some other manner. For instance, user 142 may use cursor 441 to drag an edge/corner of the border surrounding display element 431 to resize and/or move the obscured area corresponding to display element 431 (e.g., screen sharing system 101 may not have included everything in the obscured area initially). Similarly, user 142 may indicate that an element, such as display element 433, need not be obscured. In those examples, user 142 may be presented with a window similar to query window 701 where user 142 can indicate whether they want to train the machine learning algorithm to not obscure elements like display element 433 in the future.

Figure 8:
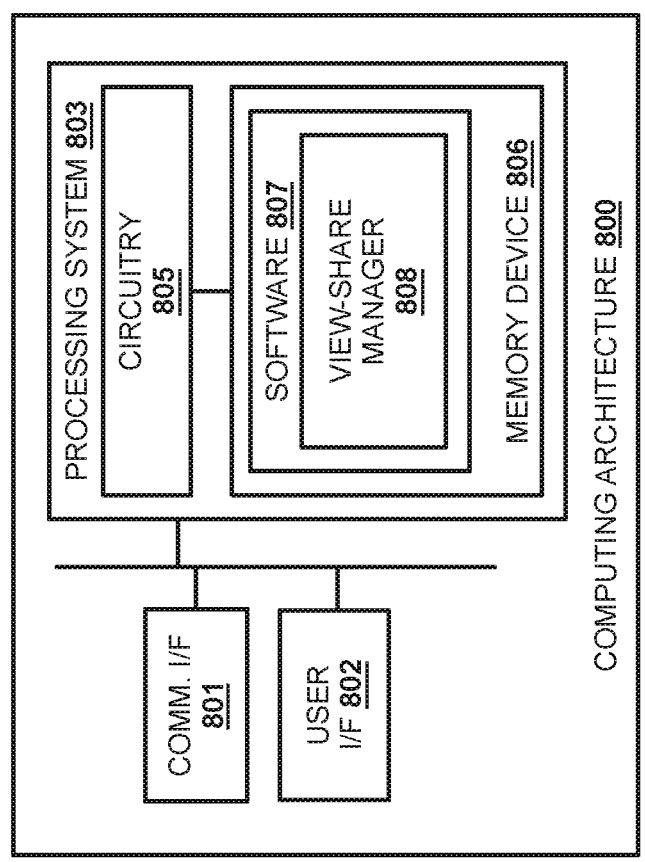
FIG. 8 illustrates a computing architecture for automatically obscuring a portion of a view shared during a screen sharing session.

FIG. 8 illustrates computing architecture 800 for automatically obscuring portions of a view shared during a screen sharing session. Computing architecture 800 is an example computing architecture for screen sharing system 101, although screen sharing system 101 may use alternative configurations. Computing architecture 800 may also be an example computing architecture for other computing elements herein, such as user systems 102, 103, 302, and 303. Computing architecture 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a computer readable storage medium, such as a disk drive, flash drive, data storage circuitry, or some other memory apparatus. In no examples would a storage medium of memory device 806 be considered a propagated signal. Operating software 807 comprises computer programs, firmware, or some other form of machine-readable processing instructions. Operating software 807 includes view-sharing manager 808. Operating software 807 may further include an operating system, utilities, drivers, network interfaces, applications, or some other type of software. When executed by processing circuitry 805, operating software 807 directs processing system 803 to operate computing architecture 800 as described herein.

In particular, view-sharing manager 808 directs processing system 803 to receive a view displayed by a first user system to a first user. View-sharing manager 808 further directs processing system 803 to identify a portion of the view that not to be shared and obscure the portion of the view to generate a shared view. Also, view-sharing manager 808 directs processing system 803 to transmit the shared view to a second user system over a real-time screen sharing session, wherein the second user system displays the shared view to a second user.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method comprising:
   receiving a view displayed by a first user system to a first user;
   providing the view to a machine learning algorithm trained to identify display elements in the view that are not to be viewed by a second user, wherein the display elements are included in a portion of the view not to be shared;
   after providing the view to the machine learning algorithm, displaying an indication of the portion of the view to the first user on the view, wherein the indication identifies the portion of the view to the first user and signifies to the first user that the portion is obscured when the view is shared;
   receiving user input from the first user, wherein the user input modifies the portion of the view;
   in response to receiving second user input requesting that the machine learning algorithm be trained, providing, to the machine learning algorithm, the view and an indication of the portion of the view, as modified by the user input, to train the machine learning algorithm;
   obscuring the portion of the view to generate a shared view; and
   transmitting the shared view to a second user system over a real-time screen sharing session, wherein the second user system displays the shared view to the second user.

2. The method of claim 1, wherein the indication still allows the portion to be viewed by the first user.

3. The method of claim 2, wherein the indication comprises a border around the portion of the view.

4. The method of claim 1, comprising:
   after displaying the indication, receiving user input from the first user, wherein the user input modifies the portion of the view.

5. The method of claim 1, wherein the machine learning algorithm outputs parameters defining locations of the view that are included in the portion of the view.

6. The method of claim 1, comprising:
   providing, to the machine learning algorithm, training views and indications of portions in the training views that are not to be shared to train the machine learning algorithm.

7. The method of claim 1, comprising:
   receiving user input enabling a view-obscuring feature, wherein obscuring the portion of the view to generate the shared view occurs when the view-obscuring feature is enabled.

8. An apparatus comprising:
   one or more computer readable storage media;
   a processing system operatively coupled with the one or more computer readable storage media; and
   program instructions stored on the one or more computer readable storage media that, when read and executed by the processing system, direct the processing system to:
   receive a view displayed by a first user system to a first user;
   provide the view to a machine learning algorithm trained to identify display elements in the view that are not to be viewed by a second user, wherein the display elements are included in a portion of the view that not to be shared;
   after the view is provided to the machine learning algorithm, display an indication of the portion of the view to the first user on the view, wherein the indication identifies the portion of the view to the first user and signifies to the first user that the portion is obscured when the view is shared;
   receive user input from the first user, wherein the user input modifies the portion of the view;
   in response to receipt of second user input requesting that the machine learning algorithm be trained, provide, to the machine learning algorithm, the view and an indication of the portion of the view, as modified by the user input, to train the machine learning algorithm;

obscure the portion of the view to generate a shared view; and transmit the shared view to a second user system over a real-time screen sharing session, wherein the second user system displays the shared view to the second user.

9. The apparatus of claim 8, wherein the indication still allows the portion to be viewed by the first user.

10. The apparatus of claim 9, wherein the indication comprises a border around the portion of the view.

11. The apparatus of claim 8, wherein the program instructions direct the processing system to:

after the indication is displayed, receive user input from the first user, wherein the user input modifies the portion of the view.

12. The apparatus of claim 8, wherein the machine learning algorithm outputs parameters defining locations of the view that are included in the portion of the view.

13. The apparatus of claim 8, wherein the program instructions direct the processing system to:

provide, to the machine learning algorithm, training views and indications of portions in the training views that are not to be shared to train the machine learning algorithm.

14. One or more non-transitory computer readable storage media having program instructions stored thereon that, when read and executed by a processing system, direct the processing system to:

receive a view displayed by a first user system to a first user;

provide the view to a machine learning algorithm trained to identify display elements in the view that are not to be viewed by a second user, wherein the display elements are included in a portion of the view that not to be shared;

after the view is provided to the machine learning algorithm, display an indication of the portion of the view to the first user on the view, wherein the indication identifies the portion of the view to the first user and signifies to the first user that the portion is obscured when the view is shared;

receive user input from the first user, wherein the user input modifies the portion of the view;

in response to receipt of second user input requesting that the machine learning algorithm be trained, provide, to the machine learning algorithm, the view and an indication of the portion of the view, as modified by the user input, to train the machine learning algorithm;

obscure the portion of the view to generate a shared view; and transmit the shared view to a second user system over a real-time screen sharing session, wherein the second user system displays the shared view to the second user.

* * * * *